(12) United States Patent
Shimizu et al.

(10) Patent No.: US 6,260,883 B1
(45) Date of Patent: Jul. 17, 2001

(54) STEERING COLUMN HOLDING STRUCTURE

(75) Inventors: Yoshiyuki Shimizu, Kosai; Toshiki Hattori, Yokohama, both of (JP)

(73) Assignee: Fujikiko Kabushiki Kaisha (JP)

( * ) Notice: Subject to any disclaimer, the term of this patent is extended or adjusted under 35 U.S.C. 154(b) by 0 days.

(21) Appl. No.: 09/428,417

(22) Filed: Oct. 28, 1999

(30) Foreign Application Priority Data

Oct. 30, 1998 (JP) .................................................. P10-311196

(51) Int. Cl.$^7$ .................................................. B62D 1/16
(52) U.S. Cl. ............................. 280/779; 280/750; 403/2; 403/400; 74/492
(58) Field of Search .................................. 230/775, 777, 230/779, 750; 74/492, 493; 403/2, 400

(56) References Cited

U.S. PATENT DOCUMENTS

| | | | |
|---|---|---|---|
| 3,392,599 | * | 7/1968 | White ...................................... 74/492 |
| 4,102,217 | * | 7/1978 | Yamamoto et al. .................... 74/492 |
| 5,294,149 | * | 3/1994 | Haldric et al. ........................ 280/775 |
| 5,390,955 | * | 2/1995 | Kaliszewski et al. ................ 280/777 |
| 5,605,351 | * | 2/1997 | Higashino ............................. 280/775 |
| 5,704,254 | * | 1/1998 | Thomas et al. ......................... 74/492 |
| 5,899,116 | * | 5/1999 | Armstrong et al. ..................... 74/492 |

* cited by examiner

*Primary Examiner*—Paul N. Dickson
*Assistant Examiner*—Faye M. Fleming
(74) *Attorney, Agent, or Firm*—Kilpatrick Stockton LLP

(57) ABSTRACT

A steering column holding structure, includes: a column lower bracket locating at rear end of an automobile in relation to a pedal lever, the column lower bracket holding a steering column, wherein the column lower bracket comprises: a column holding section holding the steering column; and a first and a second protruding sections formed with a first and a second through holes so that the column lower bracket is attached to a column holding frame of the automobile with bolts. In the above construction, the first protruding section is formed with an opening channel so as to open the first through hole, thereby making the first protruding section between the opening channel and the steering column as a absorbingly deforming section which is to be deformed by the pedal lever when the automobile forwardingly bumps.

3 Claims, 4 Drawing Sheets

STEERING COLUMN HOLDING STRUCTURE

BACKGROUND OF THE INVENTION

1. Field of the Invention

The present invention relates to a steering column holding structure in an automobile, more particularly relates to a steering column structure where a column lower bracket of the steering column holding structure is avoided to be moved rearward even through a brake lever of a foot pedal or the like is moved rearward when the automobile forwardingly bumps against something, thereby refraining a steering wheel rotatably connected with the steering column from moving toward a driver on the automobile.

2. Description of the Related Art

A general steering column holding structure S' is known as the structure shown in FIG. 1. As shown in FIG. 1, the general steering column holding structure S' is located at rear end of an automobile in relation to a brake lever of a foot pedal, and including column lower bracket 403 which holds a steering column 2.

The column lower bracket 403 includes: a column holding section 431 holding the steering column 2; and a pair of protruding sections 433, 433. The pair of protruding sections 433, 433 protrude from the column holding section 431 toward left end and right end of the automobile, respectively. The pair of protruding sections 433, 433 are to be connected with a column holding frame of the automobile.

In addition, the protruding sections 433, 433 are formed with a pair of through holes 432*a*, 432*a*, respectively. In this connection, the column lower bracket 403 is attached to the column holding frame of the automobile in a manner such that the protruding sections 433, 433 are connected with the column holding frame by bolts inserted into the through holes 432*a*, 432*a*.

However, in the general steering column holding structure S', when the automobile forwardingly bumps against something, a brake lever 1 of a foot pedal is moved rearward, then the brake lever 1 is able to hit the protruding section 433 of the column lower bracket 403. As the result, the motion of the brake lever 1 is transferred to the steering column 2 by means of the column lower bracket 403, thereby moving a steering wheel rotatably connected with the steering column 2 rearward. Namely, the steering wheel is moved toward a driver in the automobile, then the clearance between the driver and the steering wheel is reduced.

To avoid the result stated above, it is required to redesign for arranging the brake lever 1 and/or the column lower bracket 403 so that the brake lever 1 does not reach to the column lower bracket 403 even if the brake lever 1 is moved rearward.

SUMMARY OF THE INVENTION

The present invention has been achieved with such points in mind.

It therefore is an object of the present invention to provide a steering column holding structure wherein a column lower bracket is avoided to be moved rearward even though a brake lever of a foot pedal or the like is moved rearward, thereby increasing flexibility of design to arrange the brake lever and the column lower bracket of the steering column holding structure.

To achieve the object, according to a first aspect of the present invention, there is provided a steering column holding structure, comprising: a column lower bracket locating at rear end of an automobile in relation to a pedal lever, the column lower bracket holding a steering column, wherein the column lower bracket includes: a column holding section holding the steering column; and a first and a second protruding sections protruding from the column holding section toward left end and right end of the automobile, each of the first and a second protruding sections is formed with a first and a second through holes so that the column lower bracket is attached to a column holding frame of the automobile with connecting members which are fit into the first and the second through hole, wherein the first protruding section is formed with an opening channel so as to open the first through hole, thereby making the first protruding section between the opening channel and the steering column as a absorbingly deforming section which is to be deformed by the pedal lever when the automobile forwardingly bumps.

According to a second aspect of the present invention as it depends from the first aspect, there is provided a steering column holding structure, wherein the opening channel opens from rear end portion of the first through hole toward a rear end portion of the automobile.

According to a third aspect of the present invention as it depends from the first or the second aspect, there is provided a steering column holding structure, wherein the absorbingly deforming section has a upper wall portion which is formed with a notched portion at a rear end of the upper wall.

In the steering column holding structure stated above, when the automobile forwardingly bumps against something, the pedal lever is moved rearward and hit the first protruding section, especially hit the absorbingly deforming section, so that the column bracket is pressed so as to be entirely moved rearward by receiving a force which is going to bend the column lower bracket in such a manner that the first and the second through holes act as a fulcrum. However, since the first protruding section is formed with the opening channel which opens rearward, the column lower bracket is deformed by opening the opening channel in such a manner that the first and the second through holes act as a fulcrum according to the force by the pedal lever. In this connection, the deformation of the column lower bracket is easily performed.

As stated hereinbefore, since the column lower bracket is deformed at the first protruding section which is hit by the pedal lever, namely at the absorbingly deforming section, the column bracket is not entirely moved rearward. Therefore, the steering column is refrained from moving rearward, especially from moving toward the driver of the automobile. In the result, flexibility of design to arrange the brake lever and the column lower bracket of the steering column holding structure is increased.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
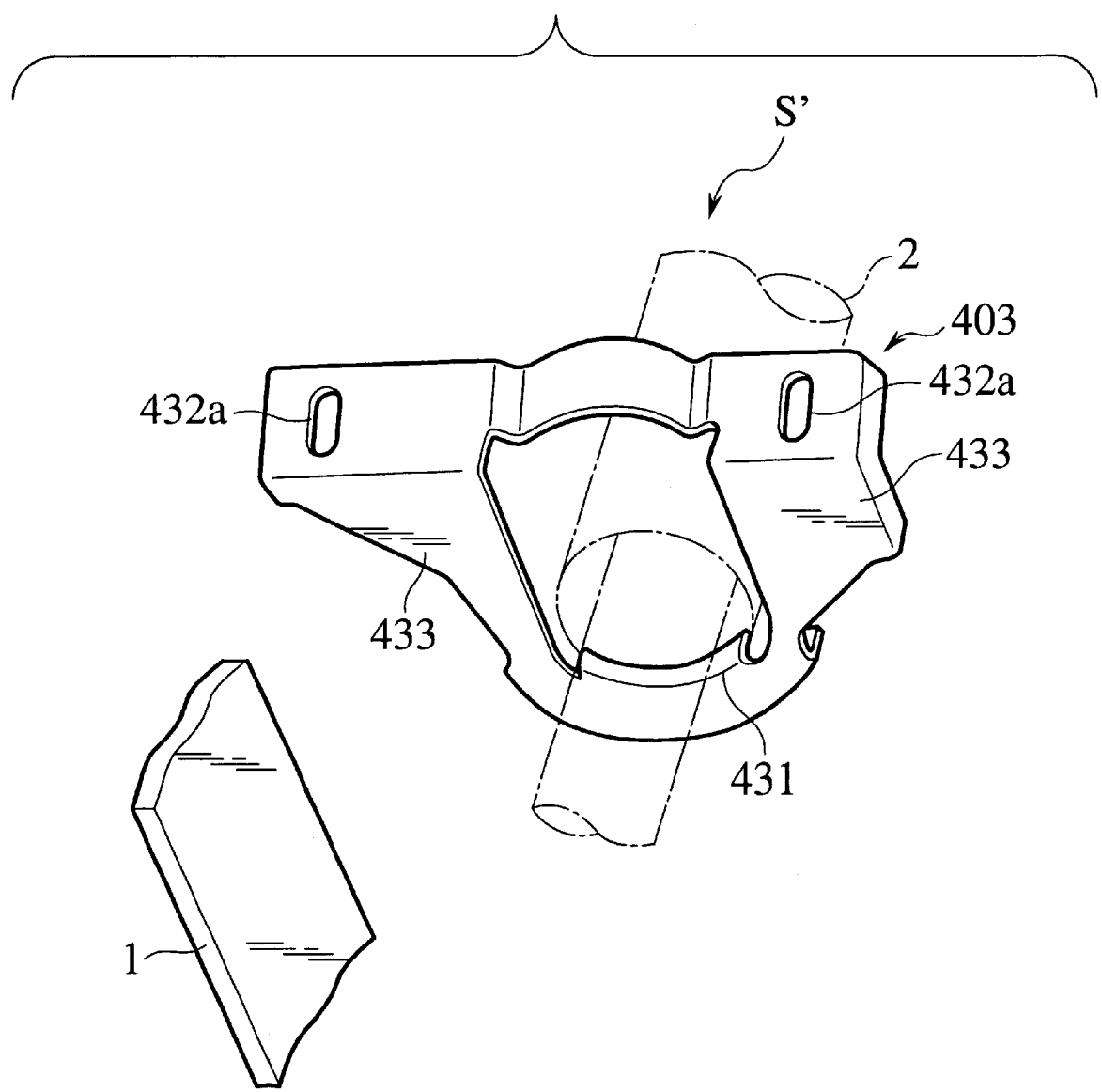
FIG. 1 is a perspective view of the general steering column holding structure.
Figure 2:
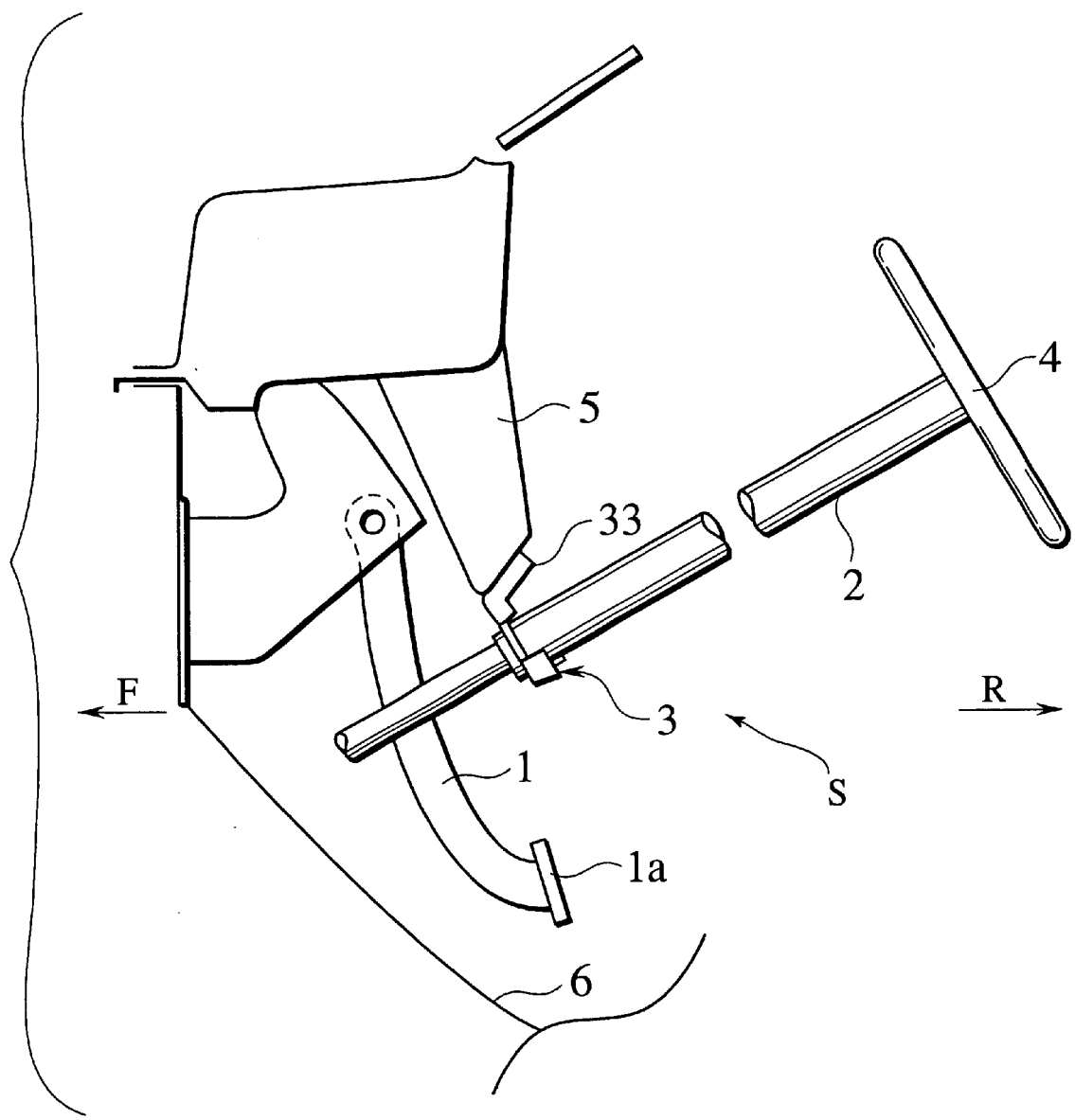
FIG. 2 is a side view showing a cockpit of an automobile including a steering column holding structure according to the present invention.
Figure 3:
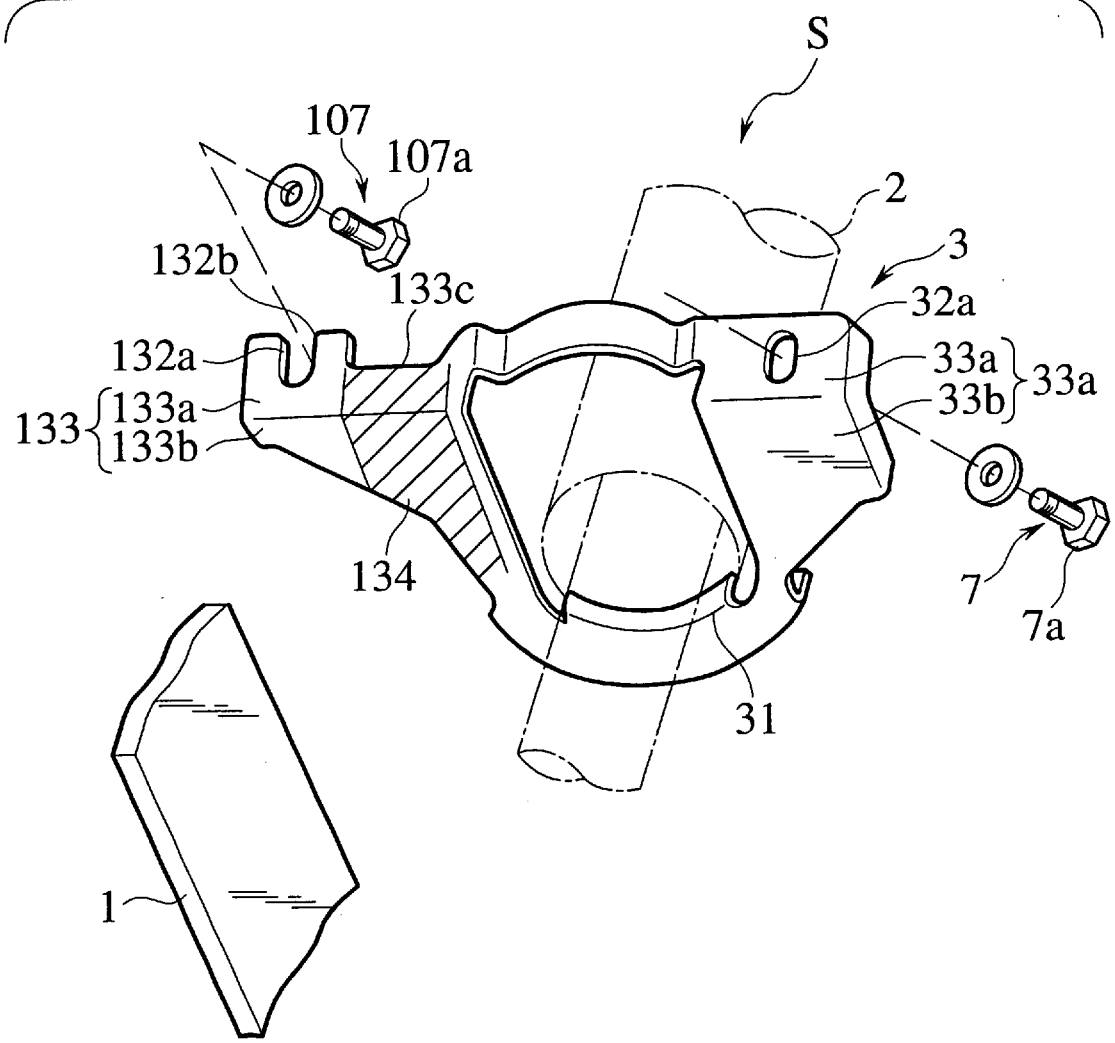
FIG. 3 is a perspective view of the steering column holding structure according to the present invention.
Figure 4:
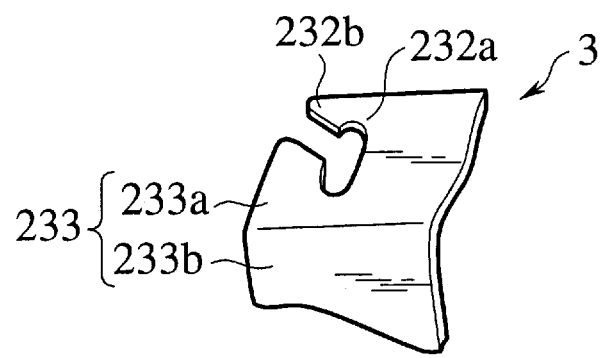
FIG. 4 is a perspective view showing a portion of the steering column holding structure according to the present invention as a second embodiment.
Figure 5:
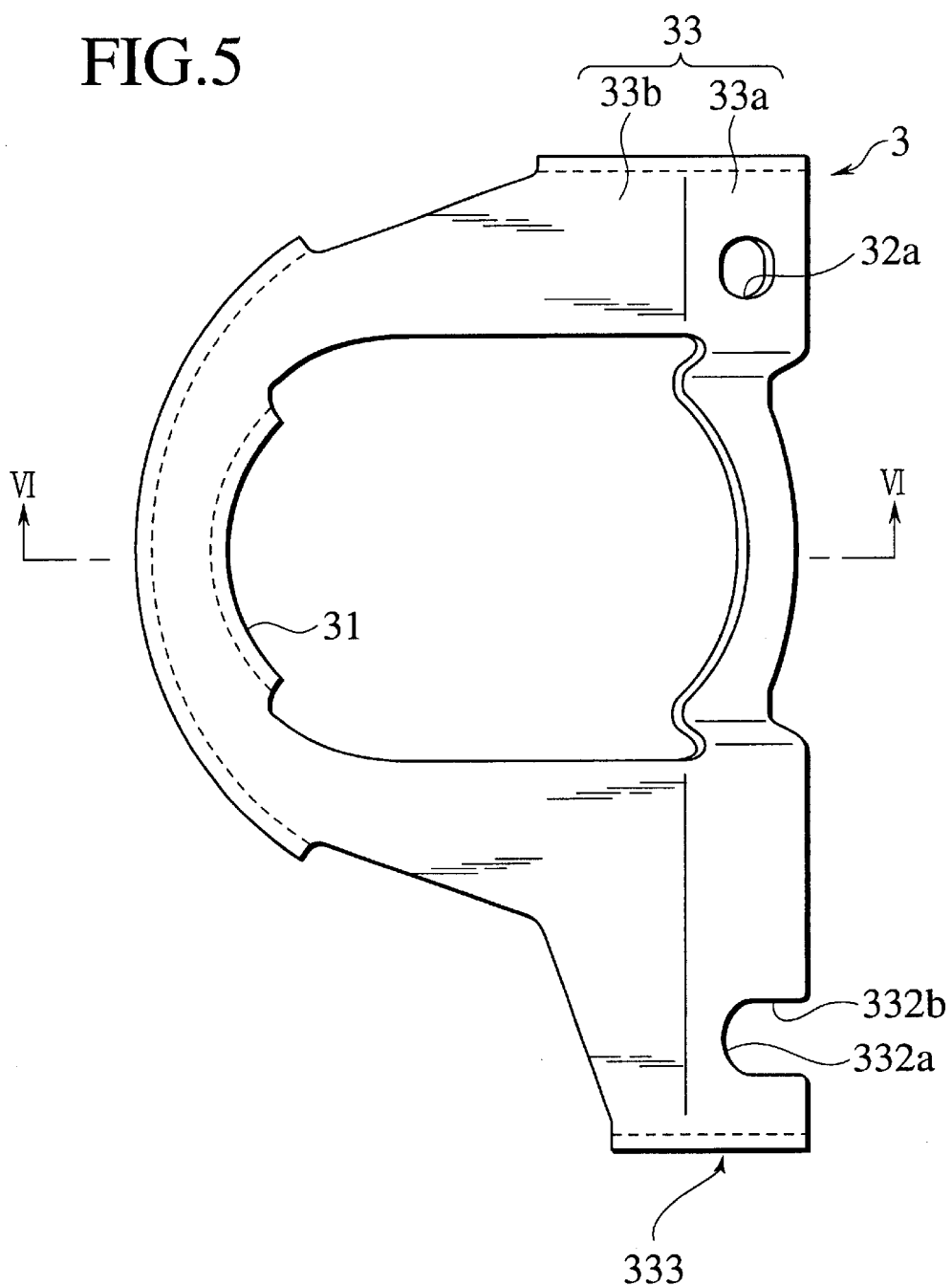
FIG. 5 is a front view showing a portion of the steering column holding structure according to the present invention as a third embodiment.
Figure 6:
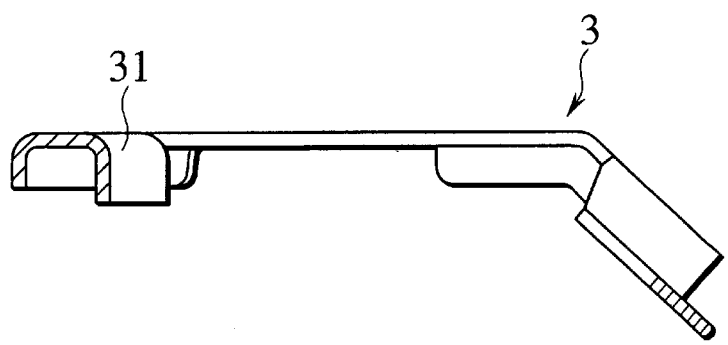
FIG. 6 is a sectional view taken along the arrows VI—VI shown in FIG. 5.

There will be detailed below the preferred embodiments of the present invention with reference to the accompanying drawings. Like members are designated by like reference characters. Here, FIG. 2 shows a cockpit of an automobile including a steering column holding structure according to the present invention; FIG. 3 shows a first embodiment; FIG. 4 shows a second embodiment; and FIGS. 5 and 6 show a third embodiment.

Referring now FIGS. 2 and 3, a first embodiment of a steering column holding structure S according to the present invention will be described hereinafter. A cockpit of an automobile is constituted by a front floor panel 6, brake lever 1 as pedal lever or other operating pedal (clutch lever), a column holding frame 5 which is attached with a vehicle body of the automobile, a column lower bracket 3 which is attached with the column holding frame 5 through a protruding section 33 of the column lower bracket 3, and a steering column 2 to which a steering wheel 4 is rotatably connected. Further, the brake lever 1 is provided with a pedal pad 1a at a tip end thereof. Forward direction where the automobile forwardly runs is shown as F, and rearward direction where the automobile reversingly runs is shown as R, in the figure, respectively. A column upper bracket which is to hold the steering column 2 at upper portion is not shown in the figure.

As shown in FIG. 3, the steering column holding structure S is located at rear end of the automobile in relation to the brake lever 1 of a foot pedal, and including the column lower bracket 3 which holds the steering column 2. The column lower bracket 3 is made of sheet metal and manufactured by press forming operation. The column lower bracket 3 includes, a column holding section 31 holding the steering column 2 by welding or the like operations, a first protruding section 133 protruding from the column holding section 31 toward right end of the automobile, and a second protruding section 33 protruding from the column holding section 31 toward left end of the automobile. The first protruding section 133 and the second protruding section 33 are to be connected to the column holding frame 5 (shown in FIG. 2) so that the column lower bracket 3 is attached with the column holding frame 5.

The first protruding section 133 is constituted by a first upper wall portion 33a and a first front wall portion 133b so as to form a letter "L" shape. The second protruding section 33 is constituted by a second upper wall portion 33a and a second front wall portion 33b so as to also form a letter "L" shape. The first upper wall portion 133a is formed with a first through hole 132a and the second upper wall portion 33a is formed with a second through hole 32a. The column lower bracket 3 is attached to the column holding frame 5 of the automobile with connecting members 107, 7 which are fit into the first and the second through hole 132a, 32a. The connecting members 107, 7 are bolts which have head portions 107a, 7a in the embodiment.

Especially, the first protruding section 133 located at rearward of the brake lever 1 is formed with an opening channel 132b so as to open the first through hole 132a rearwardly. In this connection, a portion including the opening channel 132b of the first protruding section 133 which is shown with hatching in FIG. 3 as an absorbingly deforming section 134, is almost constructed by the first front wall portion 133b. Therefore, geometrical moment of inertia (second moment of area) of the absolutely deforming section 134 in a direction of a force from the brake lever 1 is reduced. In addition to the configuration, the first upper wall portion 133a is formed with a notched portion 133c so as to open rearwardly, thereby further reducing the geometrical moment of inertia of the absorbingly deforming section 134 in the direction of the force from the brake lever 1.

The second through hole 32a which is not formed with any opening channel is formed as a slit extending in a fore-and-aft direction of the automobile, so that the position of the column lower bracket 3 is flexibly adjusted in the fore-and-aft direction.

In the construction stated above, when the automobile forwardingly bumps against something, the brake lever 1 is moved rearward and hit the first protruding section 133, especially hit the absorbingly deforming section 134, so that the column lower bracket 3 is pressed so as to be entirely moved rearward by receiving the force which is going to bend the column lower bracket 3 between the steering column 2 and the opening channel 132b in such a manner that the first and the second through holes 132 a,32a act as a fulcrum. However, since the first protruding section 133 is formed with the opening channel 132b which opens rearwardly, and since the geometrical moment of inertia of the absorbingly deforming section 134 is smaller than that of the second protruding section 33, the column lower bracket 3 is deformed by opening the opening channel 132b in such a manner that the first and the second through holes 132 a,32a act as a fulcrum according to the force by the brake pedal lever 1. When the opening channel 132b is opened with the first through holed 132a, the opening channel 132b and the first through hole 132a are detached and disconnected from the connecting member 107. In this connection, the deformation of the column lower bracket 3 is easily performed.

As described above, since the column lower bracket 3 is deformed at the first protruding section 33 which is hit by the brake pedal lever 1 (at the absorbingly deforming section), the column lower bracket 3 is not entirely moved rearward. Therefore, the steering column 2 is refrained from moving rearward, especially from moving toward the driver of the automobile, so that reduction of a clearance between the driver and the steering wheel 4 can be avoided.

In the result, flexibility of design to arrange the brake lever 1 and the column lower bracket 3 of the steering column holding structure is increased. In other words, it is not required to redesign the arrangement of the brake lever 1 and the column lower bracket 3 even in the arrangement where the brake lever 1 locating rear hits the first protruding section 133.

Furthermore, since the column lower bracket 3 is attached to the column holding frame 5 in such a manner that the head portion 107a of the connection member(bolt) 107 is contact against a circumference (periphery) of the first through hole 132a, a portion between the column holding section 31 and first through hole 132a in the first protruding section 133 is bent by the force from the brake lever 1, so that the opening channel 132b is opened together with the first through hole 132a, thereby detaching and disconnecting the head portion 107a from the circumference of the first through hole 132a. In this connection, as the force from the brake lever 1 does not transfer to the column holding section 31, it is certainly avoided to entirely move the column lower bracket 3 rearwardly.

Additionally, the column lever bracket 3 is not deformed at the opening channel 132b, and the first and the second protruding section 133,33 by a normal force caused in a normal status of the automobile. The column lower bracket 3 is designed with taking into consideration of fatigue allowance to keep entire factor of safety.

Consequently, referring now FIG. 4, a second embodiment of as steering column holding structure S according to the present invention will be described hereinafter.

In this embodiment, a first through hole 232a corresponding to the first through hole 132a of the first embodiment and an opening channel 232b corresponding to the opening channel 132b of the first embodiment are improved as shown in FIG. 4. The first through hole 232a is formed as a slit extending in a fore-and-aft direction of the automobile, so that the position of the column lower bracket 3 is flexibly adjusted in the fore-and-aft direction. In addition, the opening channel 232b is formed so as to open in a direction inclining to the fore-and-aft direction.

In the construction of the second embodiment, as described in the first embodiment, since the column lower bracket 3 is deformed at the first protruding section 133 which is hit by the brake pedal lever 1, the column lower bracket 3 is not entirely moved rearward. Therefore, the steering column 2 is refrained from toward the driver, so that reduction of a clearance between the driver and the steering wheel 4 can be avoided.

Further, since the column lower bracket 3 is attached to the column holding frame 5 in such a manner that the head portion 107a of the connecting member 107 is contact against a circumference of a first through hole 232a, a portion between the column holding section 31 and first through hole 232a in a first protruding section 233 is bent by the force from the brake lever 1, so that the opening channel 232b is opened together with the first through hole 232a, thereby detaching and disconnecting the head portion 107a from the circumference of the first through hole 232a. In this connection, as the force from the brake lever 1 does not transfer to the column holding section 31, it is further certainly avoided to entirely move the column lower bracket 3 rearwardly.

Referring now FIGS. 5 and 6, a third embodiment of a steering column holding structure S according to the present invention will be described hereinbelow.

In this embodiment, a first through hole 332a corresponding to the first through hole 132a of the first embodiment is formed in a first protruding section 333 which is located in a right end of the column lower bracket 3, and an opening channel 332b corresponding to the opening channel 132b of the first embodiment is formed also in the first protruding section 333 which is located also in the right end of the column lower bracket 3. Namely, the column lower bracket 3 of the third embodiment shown in FIG. 5 substantially equals to a column lower bracket 3 which is turned over (as mirror image) from the centrifugation shown in FIG. 3. In other wards, the opening channel 332b of the third embodiment is located at left end of the steering column 2, and the opening channel 132b of the first embodiment is located at right end of the steering column 2.

According to the steering column holding structure S including the opening channel 332b, the same result as in the first embodiment is gained.

In addition, the configuration of the opening channel 332b and the first through hole 332a of the third embodiment can be improved as in the second embodiment, namely to make the opening channel 332b inclining to the fore-and-aft direction of the automobile.

The entire contents of Japanese Patent Application P10-311196 (filed Oct. 30, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A steering column holding structure, comprising:
   a column lower bracket locating at rear end of an automobile in relation to a pedal lever, the column lower bracket holding a steering column;
   wherein the column lower bracket comprises:
      a column holding section holding the steering column; and
      a first and a second protruding sections protruding from the column holding section toward left end and right end of the automobile, each of the first and a second protruding sections is formed with a first and a second through holes so that the column lower bracket is attached to a column holding frame of the automobile with connecting members which are fit into the first and the second through hole,
      wherein the first protruding section is formed with an opening channel so as to open the first through hole, thereby making the first protruding section between the opening channel and the steering column as an absorbingly deforming section which is to be deformed by the pedal or lever when the automobile forwardingly bumps; and
      wherein the second through hole is a complete circle so that the second protruding section is not formed with any opening channel, whereby the second through hole is of closed shape.

2. A steering column holding structure according to claim 1, wherein the opening channel opens from rear end portion of the first through hole toward a rear end portion of the automobile.

3. A steering column holding structure according to claim 1, wherein the absorbingly deforming section has a upper wall portion which is formed with a notched portion at a rear end of the upper wall.

* * * * *